METHOD OF IMPROVING THE ELECTRICAL CHARACTERISTICS OF THIN FILM METAL-INSULATOR-METAL STRUCTURES

Filed June 18, 1962

INVENTORS
SOLOMON R. POLLACK
CLARENCE E. MORRIS
BY
Thomas J. Moran
ATTORNEY

United States Patent Office 3,359,466
Patented Dec. 19, 1967

3,359,466

METHOD OF IMPROVING THE ELECTRICAL CHARACTERISTICS OF THIN FILM METAL-INSULATOR-METAL STRUCTURES

Solomon R. Pollack, Philadelphia, and Clarence E. Morris, Audubon, Pa., assignors to Sperry Rand Corporation, New York, N.Y., a corporation of Delaware Filed June 18, 1962, Ser. No. 203,131
1 Claim. (Cl. 317—234)

This invention relates to electrical devices. More particularly, this invention relates to thin film structures and electrical devices comprising such thin film structures. More particularly, this invention relates to thin film structures useful in tunneling devices.

Electrical devices embodying thin films are of interest to the elctrical industry since thin films such as thin films of an electrically conductive metal, can readily and conveniently be prepared and possess many advantages. Some advantages are the relative ease with which electrical devices embodying thin films are prepared and the low cost of preparing such films. Further, thin film structures useful as electrical devices occupy very little space. Accordingly, electrical devices embodying thin film structures as an important or essential element thereof are readily susceptible to microminiaturization.

Accordingly, it is an object of this invention to prepare thin film structures useful in electrical devices, such as thin film structures useful in a tunneling device.

Another object of this invention is to prepare new and useful thin film structures and electrical devices embodying such thin film structures.

Figure 1:
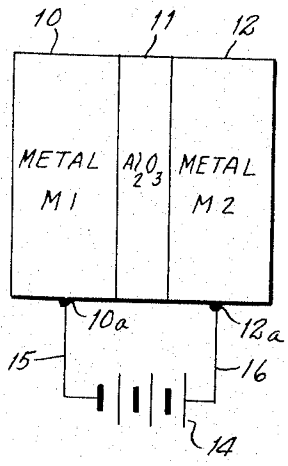
Figure 2:
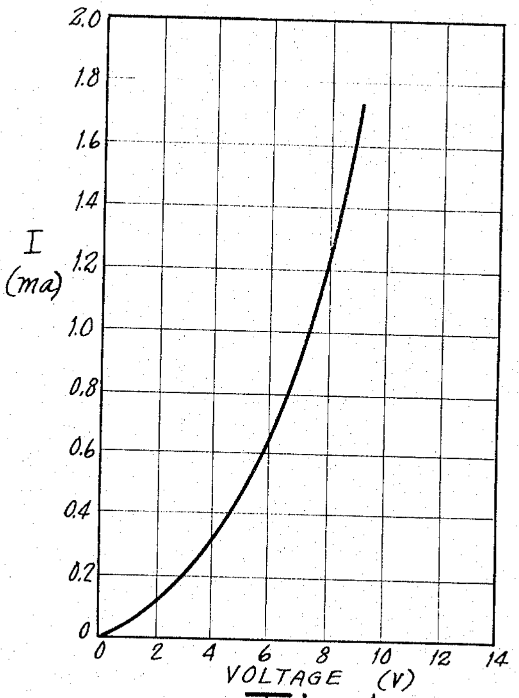
Figure 3:
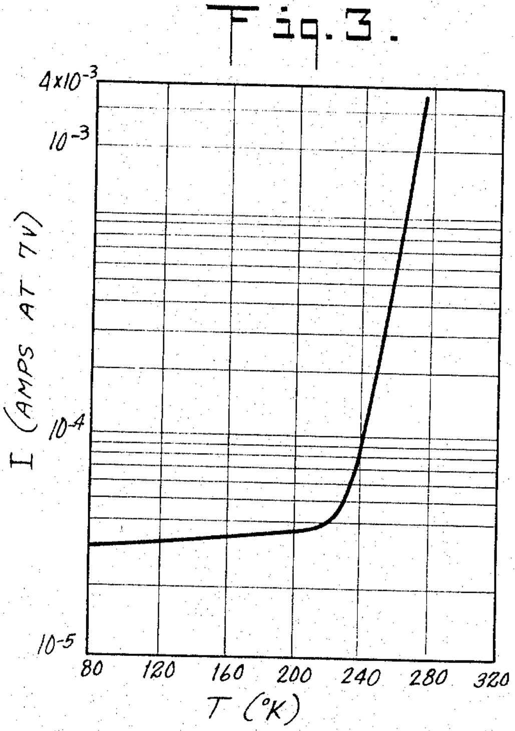
Figure 4:
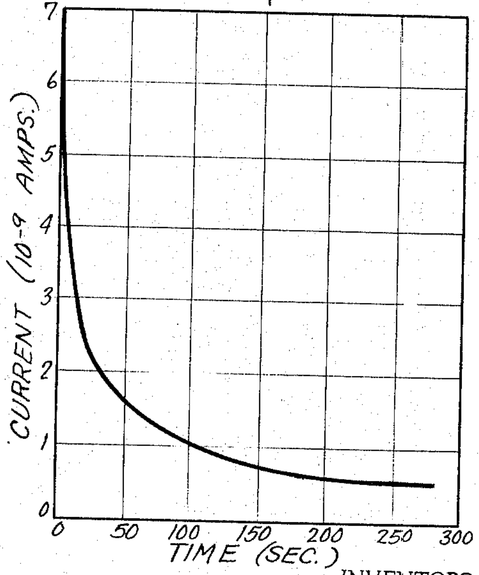

How these and other objects of this invention are accomplishhed will become apparent in the light of the accompanying disclosure made with reference to the accompanying drawings wherein:

FIG. 1 schematically illustrates an electrical device embodying a thin film structure in accordance with this invention;

FIG. 2 is a graphical representation of current-voltage (I-V) characteristic curves of a thin film structure prepared in accordance with this invention;

FIG. 3 graphically illustrates current as a function of temperature flowing under a given voltage through a thin film structure prepared in accordance with this invention; and FIG. 4 graphically illustrates an electrical property of a thin film structure prepared in accordance with this invention.

It has now been discovered that a thin film structure comprising a film of electrically conductive metal, a film of aluminum oxide, another film of electrically conductive metal, said film of aluminum oxide being positioned between and in contact with said films of electrically conductive metal, one of said films of electrically conductive metal being a metal other than aluminum, posseses useful electrical properties and are useful in electrical devices, such as tunneling devices.

Referring now to FIG. 1 of the drawings which schematically illustrates an electrical device embodying a thin film structure in accordance with this invention, as illustrated therein, an electrically conductive metal film M1 indicated by reference numeral 10 is deposited on a suitable substrate, not shown. Deposited on metal film 10 is a film 11 of aluminum oxide ($Al_2O_3$). Deposited upon film 11 of aluminum oxide is another film 12 of electrically conductive metal M2. Metals M1 and M2 may be the same or dissimilar metals provided, however, that at least one of the metal films 10 and 12 in contact with film 11 of aluminum oxide be of a metal other than aluminum. As illustrated means are shown comprising a suitable voltage source such as battery 14 electrically connected at its terminals via conductors 15 and 16 to metal films 10 and 12 at contacts 10a and 12a, respectively. In the device illustrated in FIG. 1 battery 14 impresses a voltage across film 11 of aluminum oxide through electrodes or metal films 10 and 12.

Various means other than battery 14 may be employed to impress a voltage across aluminum oxide film 11. Further, thin film structures prepared in accordance with this invention embodying the combination of components, metal films 10 and 12 separated by aluminum oxide film 11, may comprise more than the three layer structure shown in FIG. 1 which is the essential combination of components. Specifically, an additional layer or film of aluminum oxide may be deposited upon metal films 10 and/or 12 or additional films of dissimilar metal may be deposited upon metal films 10 and/or 12 followed by the deposition of additional film or films of aluminum oxide provided, however, the resulting combination of films includes the combination of components or films illustrated in FIG. 1.

Various electrically conductive metals may be employed in the manufacture of thin film structures described hereinabove and illustrated in FIG. 1. Suitable electrically conductive metals which may be employed as metal M1 and/or metal M2 are gold, silver platinum, palladium, aluminum, copper, zinc, chromium, iron, nickel, lead, magnesium, titanium, tantalum, vanadium, cobalt, tungsten, bismuth and the various other electrically conductive metals.

Various techniques may be employed to effect the deposition of the metal films and the aluminum oxide film to produce these thin film structures. These techniques include electrodeposition, electroless deposition, vapor deposition, cathode sputtering and the like. It is preferred, however, particularly with respect to the aluminum oxide film, that the films be laid down by vapor deposition, i.e. high temperature volatilization under a reduced pressure of the metal to be deposited to effect vaporization of the metal and condensation and deposition of the volatilized metal on the surface to be coated.

In connection with the formation of the aluminum oxide film, it is particularly preferred that the aluminum oxide film be formed by the volatilization of elemental aluminum in a controlled atmosphere containing substantially only gaseous oxygen, such as in an atmosphere containing substantially only gaseous oxygen at a pressure in the range $1\times10^{-3}$–$1\times10^{-4}$ mm. Hg. When elemental aluminum is volatilized under such conditions of oxygen partial pressure substantially simultaneous volatilization and oxidation of the aluminum occurs such that as aluminum is volatilized from the source aluminum oxide is condensed and deposits on the surface being coated.

The metal films making up the thin film structure prepared may have any suitable thickness, such as a thickness in the range 100–10,000 Angstrom units, generally in the range 5,000–10,000 Angstrom units. For example, in a three-film structure useful as a "tunnel cathode" a metal film making up the anode might have a thickness in the range 100–5,000 Angstrom units, substantially less thick than the other metal film on the other side of the insulating aluminum oxide layer and comprising the cathode which might have a thickness in the range 5,000–10,000 Angstrom units.

Thin film structures as described herein and illustrated in FIG. 1 have been studied with respect to electrical resistance, tunneling resistance (i.e., the ratio of the voltage to the quantum tunneling current between the two metal films insulated by the aluminum oxide film) and current-voltage-temperature relationship. These studies have been carried out over a wide range of temperatures, from the temperature of liquid nitrogen to room temperature. In these studies the currents observed have the voltage and temperature dependents appropriate to Schottky high field emission and the data is internally consistent. A low work function similar to that reported by P. R. Emtage and W. Tantrapern, Phys. Rev. Letters 8, 267 (1962) and M. Geller, Phys. Rev. 101, 1685 (1956) has been observed. Thus low work function reasonably accounts for the current observed at low temperature, assumed here to be due to tunneling in the Fowler-Nordheim region.

Thin film structures in accordance with this invention were prepared by the following technique. A film of metallic lead having a thickness of approximately 5,000 A. was evaporated under reduced pressure onto a 1" x 2" glass coverslide. Onto this metallic lead film was evaporated a film of aluminum oxide prepared by volatilizing substantially pure, 99.999%, aluminum in an oxygen atmosphere at a rate of approximately 0.5–1.0 A./sec. The oxygen partial pressure during the evaporation and deposition of the aluminum oxide was maintained at about $0.8\times10^{-3}$ mm. Hg by bleeding a controlled amount of gaseous oxygen into the system during evaporation. A transparent insulating film of aluminum oxide having a thickness of about 350 A., as measured using a multiple beam interferometer, was obtained. Five cross strips of metallic lead of about 5,000 A. thickness and having different widths were then evaporated onto the aluminum oxide film, thereby providing five thin film structures of varying area of the type Pb-$Al_2O_3$-Pb. The areas of the five thin film structures were integral multiples of $2.5\times10^{-3}$ cm.$^2$ ranging from $2.5\times10^{-3}$ to $2\times10^{-2}$ cm.$^2$.

Current-voltage (I-V) characteristic curves were obtained for several samples so fabricated. These curves were taken at temperatures from 80° K. to 300° K. On all samples measured the current never exceeded $10^{-7}$ amps until the aluminum oxide film was "formed," i.e., upon first applying a voltage to a virgin film, small currents (less than $10^{-7}$ amps) were obtained until a voltage of approximately 12 volts was reached. At this voltage the current started to grow and continue to grow for approximately 45 seconds, after which it remained constant in the order of milliamps. FIG. 2 of the drawing illustrates the I-V characteristics of the formed thin film structure.

From curves similar to that shown in FIG. 2 the current at a given voltage was plotted as a function of temperature. The resulting plot is shown in accompanying FIG. 3 for a voltage of 7 volts. As indicated in FIG. 3 below 235° K. the current is very weakly temperature dependent and above 235° K. the current is strongly temperature dependent.

The "forming" of the aluminum oxide film, referred to hereinabove, takes place when approximately 10–16 volts is impressed across the aluminum oxide film which has a thickness of approximately 350 A. The "forming" process has the following characteristics. For a metal-aluminum oxide-metal thin film structure having an area equal to $2.5\times10^{-3}$ cm.$^2$ the current is of the order of about $10^{-7}$ amps until a bias of approximately 12 volts is reached. At this voltage the current increases taking about 45 seconds, approximately one minute, to reach completion, at which time the current has increased to approximately $10^{-3}$ amps. The natural logarithm of the current is proportional to $V^{1/2}$ where V is the applied voltage. A formed sample which is left without a voltage impressed across it must be reformed after about almost one hour; however, the subsequent reforming requires shorter times and lower voltages. A given thin film structure can be formed with opposite polarity. The forming process is temperature dependent, requiring higher voltages and longer times at lower temperatures. It has not been possible to form a virgin film at liquid nitrogen temperatures with voltages as high as 20 volts (aluminum oxide film thickness approximately 350 A.) for times as long as two hours.

A formed thin film structure in accordance with this invention passes more current than an unformed one. It is suggested that the forming process consists of the establishment of a positive ionic space charge which, under the influence of the field, drifts toward the cathode. This positive space charge increases the field at the cathode, resulting in a decreased apparent work function. This results in a reduced metal-to-insulator work function which appears to be the reason for the increased current. As a result thicker films of aluminum oxide can be used in tunneling type devices since the same current densities are obtained in the formed films as are obtained in unformed films approximately 1/7 as thick. This is an obvious advantage since there is less chance of producing a shorted out device when the aluminum oxide film is relatively thick, e.g., greater than 100 A. in thickness.

Referring to the postulated space charge, this space charge may arise from a migration of either $Al^{3+}$ ions to vacant nearby interstices in the $Al_2O_3$ lattice, or ionized negative ion vacancies (oxygen deficiencies).

The postulated ionic space charge in the insulating aluminum oxide film suggests the possibility of after currents. To test this possibility a thin film structure lead-aluminum oxide-lead as described hereinabove was formed at 15.5 volts and the voltage decreased to zero. The sample was then shorted. Immediately after shorting the terminals were placed across a millimicroammeter and the observed current was recorded as a function of time. The observed current as a function of time is graphically illustrated in accompanying FIG. 4. The observed currents can be explained by the relaxation of the space charge back to its equilibrium distribution in the aluminum oxide film. This results in an external current, caused by relaxation of the induced charges in the metal films.

Various thin film structures have been made in accordance with the teachings of this invention. Thin film structures which have been prepared include those of the type, gold-aluminum oxide-gold, aluminum-aluminum oxide-lead, lead-aluminum oxide-lead and various others. Thin film structures which can be readily prepared in accordance with this invention include those of the type, copper-aluminum oxide-copper, gold-aluminum oxide-aluminum, chromium-aluminum oxide-chromium, chromium-aluminum oxide-aluminum, copper-aluminum oxide-gold, zinc-aluminum oxide-aluminum, iron-aluminum oxide-aluminum, iron-aluminum oxide-gold, silver-aluminum oxide-gold, silver-aluminum oxide-aluminum, silver-aluminum oxide-silver, platinum-aluminum oxide-gold, palladium-aluminum oxide-aluminum, copper-aluminum oxide-lead, silver-aluminum oxide-lead, gold-aluminum oxide-tin, zinc-aluminum oxide-tin, tantalum-aluminum oxide-aluminum, nickel-aluminum oxide-aluminum, nickel-aluminum oxide-chromium, nickel-aluminum oxide-gold, silver-aluminum oxide-chromium, tungsten-aluminum oxide-gold, tungsten-aluminum oxide-aluminum, magnesium-aluminum oxide-aluminum, cadmium-aluminum oxide-gold, cadmium-aluminum oxide-aluminum and various others.

It is particularly preferred that the thin film structures prepared in accordance with this invention be prepared by evaporation or vapor deposition of the metal involved under a reduced pressure, such as a pressure in the range from about $10^{-3}$ to about $10^{-6}$ mm. Hg absolute, more of less, depending upon the metal employed.

Advantageously, the evaporation and deposition of the metal films and the evaporation and deposition of the aluminum oxide film are carried out in a closed system under controlled reduced pressures. For example, in the formation of a thin film structure of the type gold-aluminum oxide-gold, substantially pure gold is heated and vaporized within a closed system, such as a bell jar, so as to deposit on a substrate, such as a glass slide, a film of metallic gold having a thickness in the range 5,000–10,000 A., the pressure in the bell jar during the gold evaporation and deposition operation being less than $10^{-3}$ mm. Hg absolute. Desirably, the gold film is deposited from a weighed amount of gold sufficient such that upon completion of the evaporation-deposition operation, a gold film of the desired thickness is deposited on the substrate.

Subsequent to the gold evaporation-deposition operation a controlled amount of gaseous oxygen is admitted to the system so as to yield a partial pressure of oxygen in the range of about $8 \times 10^{-4}$ mm. Hg. The system is then purged with oxygen for about 5–10 minutes. Thereupon, substantially pure elemental aluminum is evaposit a film of aluminum oxide on the previously derated in the presence of this gaseous oxygen so as to deposited metallic gold film. The evaporation rate of the aluminum, with resulting deposition of the aluminum oxide film, is carried out such that the aluminum oxide film is built up at a rate of about 1–5 A. per second. The film thickness of the aluminum oxide is controlled by employing a known weight of aluminum and evaporating the aluminum to completion. The partial pressure of gaseous oxygen during the aluminum oxide deposition operation is maintained by bleeding a controlled amount of gaseous oxygen into the system during the deposition operation.

Subsequent to the deposition of the aluminum oxide film, another gold film is deposited, this time onto the film of aluminum oxide, the deposition of the gold film being carried out in the manner described hereinabove.

The preparation of thin film structures in accordance with this invention in the manner described hereinabove is advantageous in that the thin film structures are prepared and fabricated in a controlled environment, the same system being employed for deposition of the metallic films and for the deposition of the aluminum oxide film. The handling of the films or substrate containing the films is reduced to a minimum and contaminants which are usually introduced when a film is moved from one system to another system are avoided.

If desired, the edges of the thin film structures of this invention may be provided with an insulating film of silicon monoxide, SiO, or other suitable insulating material. Further, the electrical contacts, as indicated in FIG. 1, viz. 10*a* and 12*a* to metal films 10 and 12, respectively, may be made directly to the film or through other electrically conductive metal films adjacent and in contact with films 10 and 12, respectively.

As will be apparent to those skilled in the art in the light of the accompanying disclosure, many alterations, substitutions and modifications are possible in the practice of this invention without departing from the spirit or scope thereof.

The embodiments of the invention in which an exclusive property or privilege is claimed are defined as follows:

A method of improving the electrical properties of a thin film structure comprising a film of electrically conductive metal, a film of evaporatively deposited aluminum oxide and another film of electrically conductive metal, said film of evaporatively deposited aluminum oxide having a thickness in the range 100–1000 Angstrom units and being positioned between and in contact with said films of electrically conductive metal, said films of electrically conductive metal having a thickness in the range 100–10,000 Angstrom units, which comprises at about room temperature impressing a voltage in the range from about 5 to about 25 volts across said film of evaporatively deposited aluminum oxide for a period of time in the range from about one-half minute to about five minutes, said impressed voltage and said period of time being sufficient in combination to effect a marked increase in the current flowing across said film of evaporatively deposited aluminum oxide at the end of said time period as compared with the current flowing across said film of evaporatively deposited aluminum oxide at the beginning of said time period.

References Cited

UNITED STATES PATENTS

| | | | |
|---|---|---|---|
| 3,024,140 | 3/1962 | Schmidlin | 317—234 X |
| 3,056,073 | 9/1962 | Mead | 317—234 |
| 3,116,427 | 12/1963 | Giaever | 307—88.5 |
| 3,121,177 | 2/1964 | Davis | 317—234 |
| 3,139,754 | 7/1964 | Dore | 317—234 |

JOHN W. HUCKERT, *Primary Examiner.*

JAMES D. KALLAM, DAVID GALVIN, *Examiners.*

P. F. POLISSACK, *Assistant Examiner.*